United States Patent [19]

Inoue

[11] 4,320,280

[45] Mar. 16, 1982

[54] TRAVELING-WIRE EDM METHOD

[75] Inventor: Kiyoshi Inoue, Tokyo, Japan

[73] Assignee: Inoue-Japax Research Incorporated, Yokohama, Japan

[21] Appl. No.: 127,066

[22] Filed: Mar. 4, 1980

[30] Foreign Application Priority Data

Mar. 30, 1979 [JP] Japan .................................. 54/37929
Apr. 24, 1979 [JP] Japan .................................. 54/51265

[51] Int. Cl.³ .................................................. B23P 1/02
[52] U.S. Cl. ................................. 219/69 W; 219/69 M
[58] Field of Search ................. 219/69 W, 69 M, 69 P

[56] References Cited

U.S. PATENT DOCUMENTS 3,943,321  3/1976  Pfau et al. .......................... 219/69 P
4,104,502  8/1978  Ullmann et al. ................... 219/69 W
4,163,887  8/1979  Bühler et al. ..................... 219/69 W Primary Examiner—C. C. Shaw
Attorney, Agent, or Firm—Karl F. Ross

[57] ABSTRACT

In an EDM method, a continuous wire electrode with an original radius is continuously transported through a machining zone of a workpiece. The machining zone is flushed with a liquid while a succession of electrical machining current pulses are passed between the electrode and the workpiece. Because of these machining pulses, discharge craters with raised formations are formed on the wire electrode. The method includes the step of controlling at least one parameter of the electrical machining current pulses so that the radius of the wire electrode at the location of the raised formations does not exceed the original radius of the wire electrode.

11 Claims, 5 Drawing Figures

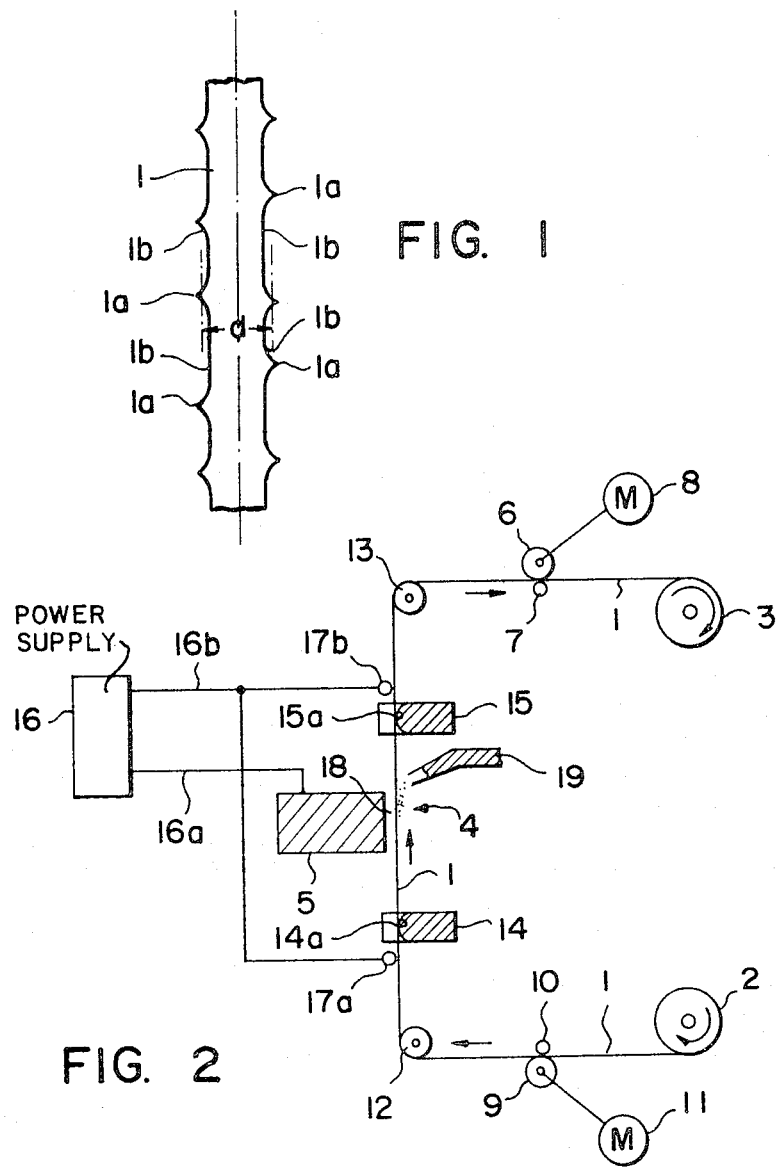

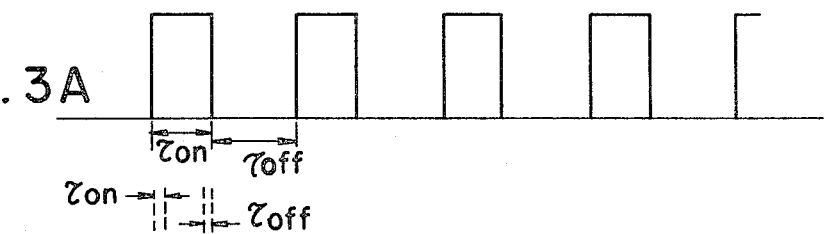
FIG. 3A
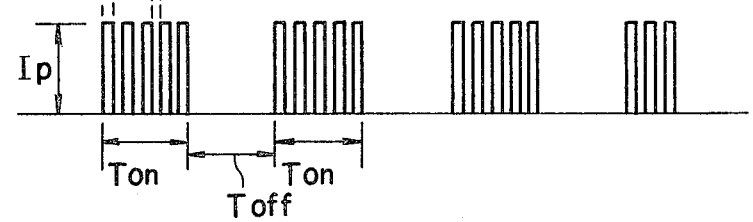
FIG. 3B
FIG. 4
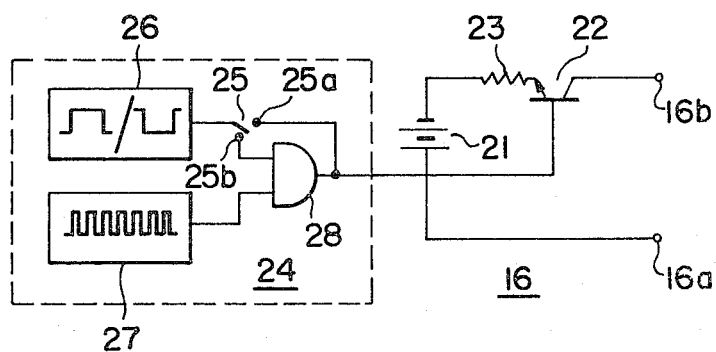

TRAVELING-WIRE EDM METHOD

FIELD OF THE INVENTION

The present invention relates to traveling-wire electrical discharge machining (EDM) and, more particularly, to a novel pulse-control method for traveling-wire EDM.

BACKGROUND OF THE INVENTION

The process of traveling-wire EDM, also called wire-cut EDM, makes use of a continuous wire electrode (of a thickness of 0.05 to 0.5 mm) which is axially advanced and transported from a supply side through a machining zone to a takeup side. In the machining zone there is positioned a workpiece and an EDM gap is formed between the advancing wire electrode and the workpiece. A machining liquid, e.g. distilled water, is supplied to fill and flush the EDM gap while a series of electrical current pulses is applied between the wire electrode and the workpiece to produce a succession of electrical discharges through the liquid medium, thereby allowing material to be removed from the workpiece. As material removal proceeds, the workpiece carried on a worktable is displaced relative to the advancing wire electrode and generally transversely to the axial direction thereof, typically under numerical control along a prescribed path to form a desired cut in or on the workpiece.

In the path of wire travel, drive rollers driven by a motor are provided immediately upstream of the takeup side to apply a traction force to the wire to continuously feed it at a predetermined rate of advancement and allow it to be continuously withdrawn from the supply side and collected into the takeup side. Further, brake rollers driven by a motor and located immediately downstream of the supply side assures that the wire electrode will smoothly travel while being stretched under tension along the wire travel path. The wire travel path also includes a pair of guide members constituted typically by smooth arcuate bearing surfaces designed to change the direction of wire travel from the supply side to the machining zone and from the latter to the takeup side, respectively. These guide members may also be used or further an additional pair of guide or support members may be provided closer to the machining zones to serve as wire-positioning guides which precisely align the tightly stretched and traveling wire in a predetermined machining position across the machining zone of the workpiece.

With the aforementioned wire transportation and guiding arrangements, the traveling wire must be held to be positioned with an extreme precision between the support members across the machining zone. Because of an extremely small size of the machining gap spacing, say, 20 to 30 microns, it will be apparent that even a slight slip of the guided wire out of the predetermined position along the supporting surfaces would cause the wire in the machining zone to come in contact with the workpiece wall being cut, thus bringing about a short-circuiting which may result in a continuous arc discharge to the detriment of the machining stability and finish precision.

I have found that with the wire guide arrangement designed to insure utmost wire guiding precision, a wire positioning inaccuracy can nevertheless develop by reason of certain peculiar deformation of the wire caused in the machining zone and during the passage of the deformed wire along the guiding surface. In the traveling-wire electrical discharge machining of a workpiece, the wire electrode undergoes wear as well by electrical discharges and the wear, when excessive, may cause the breakage of the wire. Heretofore, in setting machining parameters and, inter alia, pulse parameters, much emphasis has therefore been placed on the conditions which could minimize the wire wear. I have observed, however that in traveling-wire EDM, the deformation action by successive electrical discharges on the traveling electrode takes place in a peculiar way not recognized heretofore. The electrode surface when struck by an electrical discharge has a discharge crater formed thereon with a crater rim raised from the crater depression. I have observed that the wire electrode departing the machining zone has generated successive peculiar raised formations apparently resulting from the successive or cumulative formation of discharge craters and each formation raised from the surrounding depressed floors has a built-up height which even protrudes considerably from the original diameter of the wire electrode. I have observed that these raised formations when passing through the machining positioning guide located immediately downstream of the machining zone result in a significant deviation of the wire in the latter zone from the preset machining position and hence result in a machining inaccuracy and instabilization which cannot be avoided by a precision design of the wire guide structure. In order to avoid the aforementioned raised formations, it is undesirable and impractical to employ a lower or greater speed of the travel of the wire through the machining zone since it has been found that on one hand a minimum rate of travel is required to hold a satisfactory mean machining current and on the other hand an increased rate of travel causes an excessive wear of the wire electrode which leads to its breakage.

OBJECTS OF THE INVENTION

It is an object of the present invention to provide an improved traveling-wire EDM method which allows machining to proceed with an increased stability and yields an increased machining precision.

A specific object of the invention is to provide an improved traveling-wire EDM method which eliminates the machining inaccuracy and instabilization resulting from peculiar deformation of the machining wire electrode as discussed in the foregoing.

Another specific object of the invention is to provide an improved traveling-wire EDM method which allows the wire electrode traveling from the machining zone to be guided satisfactorily along the supporting guide member without causing a deviation of the wire portion passing through the machining zone from a preset machining position.

A further specific object of the invention is to provide an improved traveling-wire EDM method in which at least one parameter of EDM machining pulses is controlled to allow the traveling wire to be smoothly guided across the machining zone while maintaining its preset machining position relative to the workpiece.

A still further object of the invention is to provide an improved traveling-wire EDM method which is capable of attaining the object set forth in the preceding paragraph uniformly over a wide range of machining conditions imposed by changes in the workpiece thickness, the temperature of a machining liquid, the rate of supply of the machining liquid and so forth.

SUMMARY OF THE INVENTION

In accordance with the present invention, there is provided an improved EDM method of machining a workpiece by a continuous wire electrode axially advanced from a supply side to a take-up side continuously through a machining zone of the workpiece across a first wire support member in the upstream side thereof and a second wire support member in the downstream side while a succession of electrical machining current pulses are passed between the wire electrode and the workpiece in the machining zone into which a machining liquid is supplied to electroerosively remove material from the workpiece, the electrical machining current pulses causing successively on the wire electrode advanced through the machining zone, electrical discharge craters which result in the development of raised formations on the wire electrode issuing from the machining zone for guidance by the aforementioned second support member. The improvement of the invention comprises controlling at least one parameter of the electrical machining current pulses to control the deformation of the wire electrode in the machining zone so that the radius thereof at the portions of the aforementioned raised formations does not exceed an original radius of the wire electrode introduced into the machining zone.

Specifically, the controllable pulse parameter is one or both of the duration and peak current of machining current pulses which are preset in accordance with the invention in the range of 1 to 5 microseconds and in the range of 200 to 800 amperes, respectively.

Further, the machining current pulses may be in the form of intermittently interrupted or occurring trains of elementary pulses which are of a pulse duration and interval each in the range of 0.1 to 5 microseconds. In this case, at least one of the duration, and interval of successive pulse trains and the peak current of the elementary pulses can advantageously be controlled to be of a reduced value, an increased value and a higher value, respectively.

BRIEF DESCRIPTION OF DRAWING

In the accompanying drawing:

FIG. 1 is an enlarged view illustrating a wire electrode issuing out of the machining zone in a conventional traveling-wire EDM system;

FIG. 2 is a schematic view diagrammatically illustrating a traveling-wire EDM system with which the method of the invention can be carried out;

FIGS. 3(a) and 3(b) are waveform diagrams illustrating typical forms of electrical machining pulses controllable in accordance with the present invention; and FIG. 4 is a circuit diagram schematically illustrating a power-supply arrangement for providing controlled machining current pulses in accordance with the principles of the present invention.

SPECIFIC DESCRIPTION

Referring to FIG. 1, a wire electrode 1 having deformed by electrical machining discharges through a machining zone in the conventional traveling-wire EDM system is illustrated. The deformation includes added peculiar protrusions 1a raised from the remaining base or consumed electrode surfaces or depressions 1b and which even amount to a height such that the wire diameter at these portion becomes considerably greater than the original diameter d of the wire introduced into the machining zone. As noted previously, these raised portions when guided along the support surface of the positioning guide member downstream of the machining zone cause an deviation of the wire 1 traveling through the latter from a predetermined machining position relative to the workpiece.

In FIG. 2, a typical traveling-wire EDM system is diagrammatically illustrated. The wire electrode 1 is a continuous wire of an electrically conductive material such as copper or brass and typically of a diameter between 0.05 and 0.5 mm and is axially advanced in the direction of arrows and continuously transported from a supply reel 2 onto a takeup reel 3 through the machining zone 4 of a workpiece 5 carried on a worktable (not shown). In the path of wire travel, drive rollers 6 and 7 driven by a drive motor 8 are arranged immediately upstream of the takeup reel 3 to apply a traction force to the wire 1 to continuously feed it at a predetermined rete of advancement and allow it to be continuously withdrawn from the supply reel 2 and collected onto the takeup reel 3. Immediately downstream of the supply reel 2 there are arranged brake rollers 9 and 10 driven by a torque motor 11 to apply a predetermined tension to the wire electrode 1 traveling through the path. Shown also in the path are guide rollers 12 and 13 designed to change the direction of wire travel from the supply reel 2 to the machining zone 4 and from the latter to the wire takeup reel 3, respectively. Positioned across the machining zone 4 are a pair of fixed wire support and guidance members 14 and 15 designed to precisely position the wire electrode 1 passing through the machining zone 4 in a predetermined machining relationship with the workpiece 5. An EDM power supply 16 has one terminal 16a connected to the workpiece 5 and the other terminal 16b connected via brushes 17a and 17b to the wire electrode 1 to apply a succession of electrical machining current pulses, in a a form as shown in FIG. 3(a) or FIG. 3(b), the electrode 1 and the workpiece 5 through a machining gap 18 formed between them while the latter is flushed with a machining liquid supplied from a nozzle 19. Thus, the corresponding electrical machining discharges of a peak current Ip, on-time $\tau$on and off-time $\tau$off are repetitively struck through the gap 18 between the workpiece 5 and the wire electrode 1 while the latter continuously travels through the machining zone 4 to remove material from the workpiece 5.

In the course of a machining operation, the workpiece 5 is displaced relative to the traveling wire electrode 1 and transversely to the axis thereof along a prescribed path to form a desired cut in or on the workpiece 5. The wire traction unit 6, 7, 8 and the wire brake unit 9, 10, 11 keep the wire electrode 1 to continuously advance at a predetermined rate of travel while being spanned tightly under a predetermined tension and precisely linearly between the fixed bearing surfaces of machining positioning guide members 14 and 15 to allow the traveling wire 1 to maintain its predetermined position in the machining zone 4 relative to the workpiece 5.

In accordance with the present invention, the aforementioned wire mispositioning arising from the passage of the wire electrode 1 from the machining zone 4 on the bearing surface 15a of the wire guide member 15 is avoided by the controlled application of machining current pulses such that the raised formations 1a shown in FIG. 1 should be controlled not to build up to a height greater than the original radius d/2 of the wire 1. This requires a greater wear of the wire electrode 1 or a deeper formation of depressions 1b on the wire 1 by electrical discharges in the machining zone 4 to a maximum permissible extent and this has been found to be attainable by adjusting parameters of machining current pulses. Thus, when a uniform succession of machining pulses as shown in FIG. 3(a) is employed, the pulse peak current Ip should be a greater value and should range at least 200 amperes and up to 800 amperes, preferably up to 400 amperes whereas the pulse duration or on-time $\tau$on should be a smaller value and should range at most 5 microseconds and practically not less than 1 microsecond. These parameter settings which are particularly (but not exclusively) applicable to the machining of a steel workpiece with a copper wire electrode deviate considerably from the corresponding settings which have been employed in the conventional traveling-wire EDM practice in which with a wear-mode (which allows wire electrode wear) the pulse peak current Ip ranges between 50 and 100 amperes and the pulse duration or on-time $\tau$on ranges between 10 and 50 microseconds.

FIG. 4 schematically shows an exemplary power supply arrangement generally shown at 16 in FIG. 2 for carrying out the present invention. The power supply 16 is shown comprising a DC source 21 and a power switch 22 and a circuit resistance 23 connected in series to provide output pulses across the terminals 16a and 16b. The power switch 22 shown by a transistor but typically constituted by a bank of power transistors is energized by a signal pulser 24 designed to alternately turn on and off the switch 22 with control signal pulses so that a corresponding succession of machining pulses develop across the output terminals 16a and 16b connected to the workpiece 5 and to the wire electrode 1 in FIG. 2, respectively.

The signal pulser 24 is here designed to allow two modes of machining pulses, generally shown in FIGS. 3(a) and 3(b), selectively to develop and includes a selector switch 25, a first timer 26 for providing signal pulses of longer on-time and off-time, a second timer 27 for providing signal pulses of shorter on-time and off-time and an AND gate 28.

When the selector switch 25 is in its one position denoted by 25a, the output of the first timer 26 is applied to the power switch 22 and a succession of machining current pulses of a peak pulse current Ip determined by the output rating of the DC source 21 and the circuit resistance 23 and a pulse duration or on-time $\tau$on and a pulse interval or off-time $\tau$off as shown in FIG. 3(a) are passed between the wire electrode 1 and the workpiece 5 (FIG. 2). The pulse on-time $\tau$on and off-time $\tau$off are basically preset at the timer 26 with the on-time in the range previously defined together with the peak current Ip in accordance with the principles of the present invention. The DC source should be of an elevated output voltage of 300 to 500 volts to assure the greater value of the pulse peak current previously shown.

When the selector switch 25 is switched to a second position denoted by 25b, the power supply 16 alters its switching mode and provides a succession of machining current pulses in the form shown in FIG. 3(b). In this case, low-frequency signal pulses of greater on-time and off-time from the first timer 26 and high-frequency signal pulses of shorter on-time and off-time from the second timer 27 are combined at the AND gate 28 which thus provides periodically occurring trains of shorter signal pulses and applies the signal pulse trains to the output power switch 22. The latter is turned on and off accordingly to cause the successive trains with a duration Ton and an interval Toff of short elementary pulses with a duration $\tau$on, an interval $\tau$off and a peak current Ip to be passed between the wire electrode 1 and the workpiece 5 through the machining gap 18.

In an EDM operation with this latter form of machining pulses, the duration $\tau$on and the interval $\tau$off of elementary pulses are set to be each of a minimum fixed value, say, 1 microsecond, generally in the range of 0.1 and 5 microseconds to allow a minimum unit of material removal and one or both of train duration Ton and interval Toff can be varied to avoid the excessive buildup of raised formations 1a (FIG. 1) on the wire electrode 1 in the machining zone 4 while the peak current Tp may be adjusted in conjunction with the fixed duration $\tau$on and the interval $\tau$off of elementary pulses and the variable or fixed duration Ton and/or interval Toff of pulse trians to establish adequate EDM conditions required from the electrode and workpiece materials, the workpiece thickness and the temperature of the machining liquid. It has been found that a satisfactory prevention of the aforementioned excessive buildup of raised formations 1a is achieved by using a reduced value of the train duration Ton and an increased value of the train interval Toff, and an increased pulse peak current Ip individually or in a combination.

What is claimed is:

1. An EDM method of machining a workpiece, comprising the steps of:
   axially advancing a continuous wire electrode with an original radius from a supply side to a take-up side to continuously transport said wire electrode through a machining zone of a workpiece between a first wire support member at the upstream side and a second wire support member at the downstream side;
   supplying a machining liquid to said machining zone;
   passing a succession of electrical machining current pulses between the wire electrode and the workpiece in the machining zone flushed with said machining liquid to electroerosively remove material from the workpiece and simultaneously producing with said pulses successively on said wire electrode during passage through the machining zone, electrical discharge craters thereby forming raised formations on said wire electrode leaving said machining zone and guided by said second support member; and
   controlling at least one parameter of said electrical machining pulses to control the deformation of said wire electrode in said machining zone so that the radius of said wire electrode leaving said zone at the portions of said raised formations does not exceed said original radius of said wire electrode advanced into said machining zone.

2. The method defined in claim 1 wherein said parameter is the pulse peak current of said machining current pulses.

3. The method defined in claim 2 wherein said peak current is in the range between 200 and 800 amperes.

4. The method defined in claim 3 wherein said peak current is not greater than 400 amperes.

5. The method defined in claim 1 wherein said parameter is the pulse duration of machining current pulses.

6. The method defined in claim 5 wherein said pulse duration is in the range between 1 and 5 microseconds.

7. The method defined in claim 2, claim 3, claim 4, claim 5 or claim 6 wherein said wire electrode is composed of a copper-base material and said workpiece is composed of a steel material.

8. The method defined in claim 1 wherein said machining current pulses are applied in the form of intermittently interrupted trains of elementary machining pulses, said parameter being at least one of the duration and interval of said pulse trains, and the pulse peak current of said elementary pulses.

9. The method defined in claim 8 wherein said elementary pulses are of a pulse duration and interval each in the range of 0.1 to 5 microseconds.

10. The method defined in claim 8 wherein said parameter is at least one of the duration and interval of said pulse trains, further comprising the step of adjusting the peak current of said elementary pulses together with the pulse duration and interval thereof to establish a predetermined EDM condition at least in part required from the electrode and workpiece materials, low workpiece thickness and the temperature of said machining liquid.

11. The method defined in claim 8 where the duration of said elementary pulses is in the range between 0.1 and 5 microseconds adjusted to effect a minimum unit of electroerosive material removal from the workpiece.

* * * * *